No. 641,424. Patented Jan. 16, 1900.
R. ZIEBELL.
ANIMAL POWER.
(Application filed May 20, 1898.)
(No Model.)
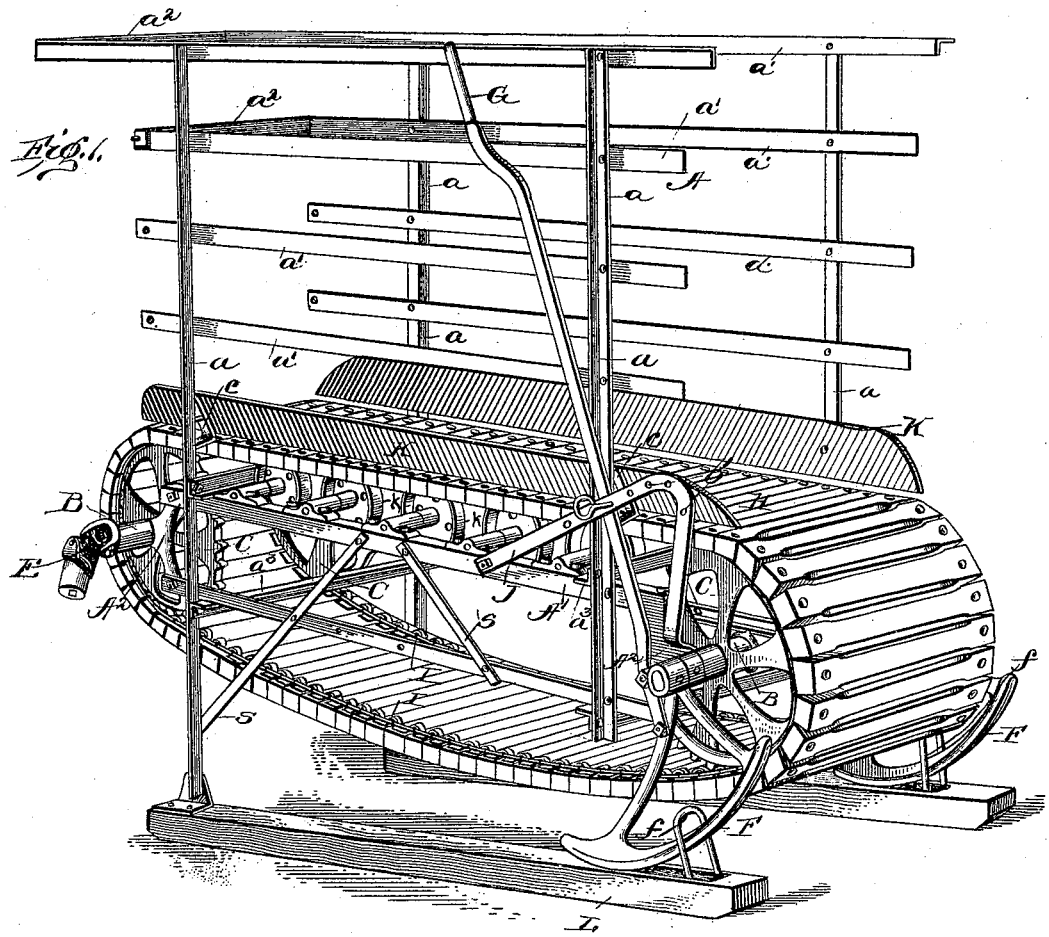
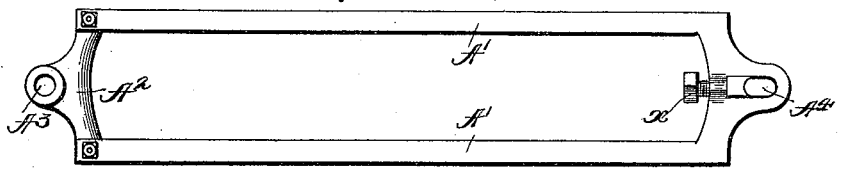

UNITED STATES PATENT OFFICE.

ROBERT ZIEBELL, OF SHEBOYGAN FALLS, WISCONSIN.

ANIMAL-POWER.

SPECIFICATION forming part of Letters Patent No. 641,424, dated January 16, 1900.

Application filed May 20, 1898. Serial No. 681,189. (No model.)

*To all whom it may concern:*

Be it known that I, ROBERT ZIEBELL, a citizen of the United States, residing at Sheboygan Falls, in the county of Sheboygan and State of Wisconsin, have invented certain new and useful Improvements in Animal-Powers; and I do hereby declare the following to be a full, clear, and exact description of the invention, such as will enable others skilled in the art to which it appertains to make and use the same.

My invention relates to animal-powers; and it comprises an apron or tread supported on peculiarly-constructed frames and wheels or pulleys and having on the rear axle eccentrically-mounted segments which rest on the ground or on suitable beams provided therefor.

The objects of the invention are to construct a neat, light, and very efficient animal-power and one which can be raised or lowered at the rear end to accommodate the weight of the animal to be used and also to provide for adjusting the apron.

I will now proceed to describe the structure in detail, referring to the accompanying drawings, forming part of this specification, and on which—

Figure 1 is a perspective view of the power, and Fig. 2 is a detailed plan view of one of the side frames or supports.

Like letters of reference indicate corresponding parts in the different views.

A represents the main frame. It is constructed of any suitable material, preferably of bar-steel, and comprises vertical uprights or supports $a\ a$ in the front and rear and horizontal bars $a'\ a'$ connecting and bolted or riveted to the vertical supports $a\ a$. The two front supports $a\ a$ in practice are designed to be connected in any suitable way to their bases, so as to be tilted as the rear end of the machine is adjusted out of the perpendicular, as in raising or lowering said latter end, as hereinafter more fully disclosed. The two rear supports $a\ a$ are shorter than those at the front and are connected to the suplemental side frames or supports, as will be presently explained. The top pair of longitudinal bars $a'\ a'$ are extended some distance beyond the main frame in front and provided with a transverse or cross bar $a^2$, to which the animal may be tied and still allow it to work freely. One or more of the horizontal bars below the top ones may also be provided with similar cross-bars $a^2$ to prevent the animal from jumping out.

Below the vertical center of the frame are two transverse bars $a^3\ a^3$ at each end. These bars are angular in cross-section and are secured to the uprights or supports $a\ a$ at each side above and beneath the bars of the side frames $a'$ with one flat side downward, and these cross-bars are bolted or otherwise secured to the supports or uprights $a\ a$ in the reverse direction or with one of their flat sides upward and the opposite one downward. Thus it will be seen that they form supports at each side of the power for the auxiliary frames A'.

The frames A' each comprise the longitudinal bars and curved end plates $A^2 A^2$, the latter being bolted, riveted, or otherwise secured to the horizontal bars. (See Fig. 2.) The end pieces $A^2$ have perforations or holes through which the pulley or sprocket wheel shafts pass, as at $A^3 A^4$, and the rear aperture $A^4$ is somewhat elongated, so that the apron or tread may be adjusted, as hereinafter explained.

The set-screw $x$ is mounted on the rear end of the auxiliary frame A', and said screw is adapted to be adjusted toward and against the rear sprocket-wheel shaft. Suitable braces $s\ s$ are connected to the frames, preferably in a diagonal direction, as shown, to render the parts firm and steady.

I have described the auxiliary frames A' as made of four pieces, bolted or riveted together, but it is evident that these frames may be made of one integral piece. B B are the transverse shafts which carry the pulley or sprocket wheels C C. These shafts extend across the power inside the apron, or they may be short stud-shafts extending inward toward the center. On the shafts B B, on each side, are the sprocket or pulley wheels C C, and they are mounted to revolve on the shafts B B. The front shaft B is extended at both ends and provided with a universal joint or knuckle E, adapted to be applied at either end and which may be provided with proper clutch mechanism, whereby it may be disengaged at will and by means of which power is communicated to any mechanism or device to be driven. On the rear shaft B, at each side of the projecting ends of the shaft, are eccentrically-mounted segments F F, one at each side, and on these segments the rear end of the machine is adjustably supported, while the front end is supported on the front supports a a, which, as before stated, are longer than the rear supports.

On the top bar of the auxiliary frame A' are suitable bearings, in which are mounted a series of antifriction-rolls k, on which the apron rests, and is maintained on top in a substantially horizontal position.

An inverted-V-shaped iron J is secured to the auxiliary frame A' near the rear end, but in front of the rear shaft B, and it is provided with a series of holes or apertures b' therethrough. A vertical hand-lever G is provided, and this lever is secured near its lower end to one of the segments and has holes which when it is moved in one direction or the other may be made to register with holes in the V-shaped piece J, and a suitable pin passes through the holes in the lever and piece J and holds the parts in a fixed position. When stub-shafts are employed, a lever is required on each side of the machine.

The apron H comprises a series of "lags" of the proper length, and the lags are secured by riveting or otherwise to the links of the endless chains I I. These chains are arranged on the inner sides of the apron adjacent to the two edges thereof, and the links of the chains I I engage with the sprocket-wheels C C.

Angular brackets c c are bolted or screwed to the frame supports or uprights of the main frame on the inner sides adjacent to the top or tread surface of the apron H, and to these brackets are secured side or foot boards K K, arranged in an outwardly-inclined position, as shown. These boards K K are to prevent injury to the animal while at work or in getting on or off the machine.

The machine may be readily operated on a floor or other suitable base, but I prefer to use two bars or beams L L. The bars L L have provision at the front end to receive the lower end of the front vertical support or upright, and at the rear the bars have cut-into portions to receive that portion of the eccentric segments on which the rear of the machine is supported and adjusted and will prevent the segments from slipping laterally. Suitable staples f f are provided to aid in holding the segments in proper position.

The power is very easily and cheaply constructed, and the frame, being of bar-steel, is very light and portable, so that it may be readily moved from place to place and still be of sufficient strength for effective use.

By supporting the machine in the rear by means of the eccentrically-mounted segments it is easily adjusted vertically at that point by means of the lever mechanism and fixed in the desired position, so that the machine is capable of use by a lighter or heavier animal.

The set-screw and adjacent mechanism allow a certain adjustment of the apron, as described.

The apron is practically level on top and hangs loosely at the bottom by means of its own gravity.

The inside rail or footboard prevents injury to the animal, as already stated.

Minor changes in the details of the structure within the scope of the invention may be made without departing from the spirit or sacrificing any of the advantages thereof.

Having thus fully described my invention, what I claim, and desire to secure by Letters Patent, is—

1. In a machine of the character described, the combination of a main frame or support, an auxiliary frame or support with its forward end suitably maintained upon said main frame, an endless apron or tread, the shafts or axes of whose bearing or sprocket wheels are carried by said auxiliary frame, segments eccentrically mounted upon the rear one of said axes or shafts, and arranged to contact with the surface, or their supports, at a point below said apron or tread, to permit the vertical adjustment of the rear end of said apron or tread and means for holding in position and effecting the actuation of said segments, substantially as set forth.

2. In a machine of the character described, the combination of a main frame or support, an auxiliary frame or support, with its forward end suitably mounted on said main frame, an endless apron or tread, the shafts or axes of whose bearing or sprocket wheels are carried by said auxiliary frame, segments eccentrically mounted upon the rear one of said axes or shafts, and arranged to contact with the surface, or their supports, at a point below said apron or tread, to permit the vertical adjustment of the rear end of said apron or tread, a hand-lever connected to said segments, and means for effecting the retention and adjustment of said lever in position, substantially as specified.

3. In a machine of the character described, the combination of a main frame or support, an auxiliary frame or support, with its forward end suitably carried by said main frame, an endless apron or tread, the shafts or axes of whose bearing or sprocket wheels are carried by said auxiliary frame, the segments eccentrically mounted upon the rear one of said axes, and arranged to contact with the surface, or their supports, at a point below said apron or tread, to permit the vertical adjustment of the rear end of said apron or tread, a substantially V-shaped bracket suitably supported in position, and a hand-lever connected to one of said segments and adapted to be retained and adjusted in position in connection with said bracket, as specified.

4. In a machine of the character described, the combination of a main frame or support, an auxiliary frame or support with its forward end suitably mounted and maintained upon said main frame or support, an endless apron or tread, the shafts or axes of whose sprocket or bearing wheels are carried by said auxiliary frame or support, the segments eccentrically mounted upon the rear one of said shafts or axes and arranged to contact with the surface, or their supports, at a point below said apron or tread, to permit the vertical adjustment of the rear end of said apron or tread, a substantially V-shaped serially-perforated bracket, suitably supported in position, a hand-lever connected to one of said segments, and an adjusting pin or device adapted to adjustably engage said lever with said bracket, all as described.

5. In an animal-power the combination with a main frame with vertical uprights on which the machine is supported in front, an auxiliary frame, and means by which it is supported and may be adjusted vertically in the rear, sprocket or pulley wheels, an endless apron or tread, and cleats or bars provided with means for receiving the front uprights, and at the rear with cut-out portions to receive the eccentrically-pivoted segments, substantially as described.

6. In a machine of the character described, the combination of a main frame or support, an auxiliary frame or support, suitably supported upon said main frame, an endless apron or tread, sprocket-wheels for said apron or tread, having their shafts or axes supported in the apertured forward and rear end bars of said auxiliary frame or support, segments eccentrically mounted upon the rear one of said shafts or axes and arranged to contact with the surface, or their supports, at a point below said apron or tread, to permit the vertical adjustment of the rear end of said apron or tread, and means for the retention and adjustment in position of said segments, substantially as set forth.

7. In a machine of the character described, the combination of a main frame or support, with an auxiliary frame or support, having its forward end suitably mounted and maintained upon said main frame, and provided with a series of inwardly-extending lateral axes or shafts bearing antifriction-rolls, an endless apron or tread, sprocket-wheels for said apron or tread, having their shafts or axes supported in the apertured end bars of said auxiliary frame, segments eccentrically mounted upon the rear one of said axes or shafts, a hand-lever connected with one of said segments and a V-shaped serially-apertured bracket, with an adjusting pin or device to engage said lever with said bracket, substantially as set forth.

8. In a machine of the character described, the combination of a main frame or support, an auxiliary frame or support with its forward end suitably maintained upon said main frame or support, an endless apron or tread, the shafts or axes of whose bearings or sprocket-wheels are carried by said auxiliary frame, segments eccentrically mounted upon the rear one of said axes or shafts, means for effecting the retention and adjustment in position of said segments, and cleats or bars provided with cut-out portions to receive said segments at their lower end, substantially as set forth.

In testimony whereof I affix my signature in presence of two witnesses.

ROBERT ZIEBELL.

Witnesses:
 A. O. HEALD,
 O. D. BALLSDMIDER.